United States Patent
Wang et al.

(10) Patent No.: US 11,267,719 B2
(45) Date of Patent: Mar. 8, 2022

(54) PREPARATION METHOD OF LITHIUM HYDROXIDE

(71) Applicant: QINGHAI INSTITUTE OF SALT LAKES, CHINESE ACADEMY OF SCIENCES, Xining (CN)

(72) Inventors: Min Wang, Xining (CN); Huaiyou Wang, Xining (CN); Youjing Zhao, Xining (CN); Jinli Li, Xining (CN)

(73) Assignee: QINGHA INSTITUTE OF SALT LAKES, CHINESE ACADEMY OF SCIENCES, Xining (CN)

( * ) Notice: Subject to any disclaimer, the term of this patent is extended or adjusted under 35 U.S.C. 154(b) by 0 days.

(21) Appl. No.: 17/420,397

(22) PCT Filed: Mar. 20, 2020

(86) PCT No.: PCT/CN2020/080305
§ 371 (c)(1),
(2) Date: Jul. 2, 2021

(87) PCT Pub. No.: WO2020/207223
PCT Pub. Date: Oct. 15, 2020

(65) Prior Publication Data
US 2022/0041460 A1 Feb. 10, 2022

(30) Foreign Application Priority Data
Apr. 12, 2019 (CN) .......................... 201910293912.5

(51) Int. Cl.
| | |
|---|---|
| B01D 61/02 | (2006.01) |
| B01D 61/44 | (2006.01) |
| B01D 61/58 | (2006.01) |
| C01D 15/02 | (2006.01) |
| B01D 9/00 | (2006.01) |

(52) U.S. Cl.
CPC ........... *C01D 15/02* (2013.01); *B01D 9/0022* (2013.01); *B01D 61/022* (2013.01); *B01D 61/025* (2013.01); *B01D 61/027* (2013.01); *B01D 61/44* (2013.01); *B01D 61/58* (2013.01); *B01D 2009/0086* (2013.01); *B01D 2311/2642* (2013.01); *B01D 2311/2673* (2013.01)

(58) Field of Classification Search
CPC .... B01D 61/025; B01D 61/027; B01D 61/44; B01D 2009/0086; C01D 15/02
See application file for complete search history.

(56) References Cited

U.S. PATENT DOCUMENTS 4,036,713 A 7/1977 Brown

FOREIGN PATENT DOCUMENTS

| CN | 105152191 A | 12/2015 |
|---|---|---|
| CN | 105152193 A | 12/2015 |
| CN | 206184008 U | 5/2017 |
| CN | 106865582 A | 6/2017 |
| CN | 108298569 A | 7/2018 |
| CN | 108385128 A | 8/2018 |
| CN | 108660476 A | 10/2018 |
| CN | 108946770 A | 12/2018 |
| CN | 108996527 A | 12/2018 |
| CN | 109336142 A | 2/2019 |
| CN | 109368670 A | 2/2019 |
| CN | 109437252 A | 3/2019 |
| CN | 110002475 A | 7/2019 |
| CN | 110002476 A | 7/2019 |
| CN | 110002477 A | 7/2019 |
| CN | 110028088 A | 7/2019 |
| CN | 110078102 A | 8/2019 |

OTHER PUBLICATIONS

Xiang et al—CN109336142A machine translation—Feb. 15, 2019 (Year: 2019).*
Wang et al—CN106865582A machine translation—Jun. 20, 2017 (Year: 2017).*

* cited by examiner

*Primary Examiner* — Bradley R Spies
(74) *Attorney, Agent, or Firm* — Bayramglu Law Offices LLC

(57) ABSTRACT

A preparation method of lithium hydroxide includes the following steps: A. coprecipitating a lithium extraction mother solution of salt lake brine with an aluminum salt solution and a sodium hydroxide solution, aging and then performing solid-liquid separation, washing and drying to obtain lithium aluminum hydrotalcite; B. acidifying the lithium aluminum hydrotalcite to obtain a lithium aluminate solution; C. performing nanofiltration on the lithium aluminate solution for lithium-aluminum separation, and sequentially performing primary concentration by reverse osmosis to obtain a primary concentrated lithium-rich solution; D. deeply removing aluminum from the lithium-rich solution to obtain an aluminum-removed lithium-rich solution; E. performing bipolar membrane electrodialysis on the aluminum-removed lithium-rich solution to obtain a secondary concentrated lithium-rich solution; F. evaporating the secondary concentrated lithium-rich solution for concentration to obtain lithium hydroxide.

13 Claims, No Drawings

PREPARATION METHOD OF LITHIUM HYDROXIDE

CROSS REFERENCE TO THE RELATED APPLICATIONS

This application is the national phase entry of International Application No. PCT/CN2020/080305, filed on Mar. 20, 2020, which is based upon and claims priority to Chinese Patent Application No. 201910293912.5, filed on Apr. 12, 2019, the entire contents of which are incorporated herein by reference.

TECHNICAL FIELD

The present application belongs to the technical field of comprehensive utilization of salt lake resources, and particularly relates to a preparation method of lithium hydroxide.

BACKGROUND

Lithium is the lightest metal element in nature, which is silver-white in color, has distinct physicochemical characteristics of high specific heat, high conductivity and strong chemical activity, and has a wide range of applications. At present, the metal lithium and its compounds are increasingly applied in glass ceramic, electrolytic aluminum, lubricating grease, air conditioning refrigeration, and organic synthesis, metallurgy, chemical industry, pharmaceuticals, reagents and other traditional industrial fields, and their application in the fields of aluminum lithium alloy, lithium battery and energy such as nuclear fusion, military industry, aerospace, nuclear industry and the like is also expanding rapidly, so it is honoured as "Industrial MSG", and is also considered as an important strategic material in many countries; in addition, it is also honoured as "Energy metal that drive world progress" due to its application in lithium battery. In nature, lithium resources mainly exist in solid ore and liquid brine. The important position of brine lithium resources in the development of lithium resources in the world has been established for nearly 30 years, and its application in the extraction of lithium compounds has attracted the attention of lithium resource development industry. The international trend of lithium salt production is to extract lithium mainly from salt lake brine and to extract lithium from ores supplementarily. In China, extracting lithium from salt lake brines has the advantages of abundant resources and low cost. Moreover, with the depletion of solid lithium mineral resources, salt lake brine has gradually become the main source of lithium resources.

At present, the main processes for extracting lithium from salt lake brines with a high magnesium-lithium ratio primarily include: salt field process, magnesium-lithium separation, impurities removement from lithium-containing solution, precipitation and conversion of lithium carbonate and other process steps; in which, the precipitation and conversion of lithium carbonate mean that a sodium carbonate solution is added into a lithium-rich solution to prepare lithium carbonate through precipitation reaction, and at the same time solid-liquid separation is carried out to generate a mother solution of lithium carbonate, that is the lithium extraction mother solution of salt lake brine; the lithium content in the mother solution of lithium carbonate can still reach 1 g/L-2 g/L, which is an important lithium resource and intends to be recycled.

The current recycling process for the above mother solution of lithium carbonate is generally to remove the carbonate ions in it with hydrochloric acid firstly, and then to adjust its pH value by adding an alkaline. This process is complicated and high in cost because of acid and alkaline consumption; in addition, the carbonate ions have not been utilized rationally, causing the waste of resources. Therefore, it is necessary to explore a whole new way of recycling the mother solution of lithium carbonate.

SUMMARY

To overcome the problems in the above existing technology, the present application provides a preparation method of lithium hydroxide, which utilizes a lithium extraction mother solution of salt lake brine containing lithium carbonate as a raw material to prepare lithium hydroxide, thus utilizing the lithium resources sufficiently and improving the efficiency of resource utilization.

To realize the above objective, the present application employs the following technical schemes:

A preparation method of lithium hydroxide, including the following steps:

S1. simultaneously dropwise adding an aluminum salt solution and a sodium hydroxide solution into a lithium extraction mother solution of salt lake brine for coprecipitation reaction at 25° C.-70° C., while keeping the pH of the system at 8-13, to obtain a nucleation system with lithium aluminum hydrotalcite crystal nucleus; in which, in the lithium extraction mother solution of salt lake brine, the concentration of $Li^+$ is 1 g/L-2 g/L, the concentration of $CO_3^{2-}$ is 10 g/L-30 g/L and the concentration of $OH^-$ is 5 g/L-25 g/L;

S2. aging the nucleation system at 50° C.-150° C. for 6 h-48 h for solid-liquid separation, to obtain filter cakes of lithium aluminum hydrotalcite;

S3. washing and drying the filter cakes of lithium aluminum hydrotalcite, to obtain lithium aluminum hydrotalcite;

S4. with 2 mol/L-12 mol/L of hydrochloric acid as a raw material, dissolving the lithium aluminum hydrotalcite by an acidification method, to obtain a lithium aluminate solution; in which, in the lithium aluminate solution, the concentration of $Li^+$ is 1.5 g/L-10 g/L, the concentration of $Al^{3+}$ is 10 g/L-80 g/L and the concentration of $Cl^-$ is 70 g/L-450 g/L;

S5. sequentially subjecting the lithium aluminate solution to a nanofiltration system for lithium-aluminum separation and to a reverse osmosis system for primary enrichment and concentration, to obtain a primary concentrated lithium-rich solution; in which, in the nanofiltrated desalted water obtained after nanofiltration, the concentration of $Li^+$ is 0.2 g/L-2.0 g/L and the aluminum-to-lithium ratio is 0.01-0.6; in the primary concentrated lithium-rich solution obtained after reverse osmosis, the concentration of $Li^+$ is 1.5 g/L-8.0 g/L and the aluminum-to-lithium ratio is 0.01-0.6;

S6. deeply removing aluminum from the primary concentrated lithium-rich solution, to obtain an aluminum-removed lithium-rich solution; in which, in the aluminum-removed lithium-rich solution, the concentration of $Li^+$ is 1.5 g/L-8.0 g/L and the concentration of $Al^{3+}$ is not greater than 10 ppm;

S7. performing secondary enrichment and concentration on the aluminum-removed lithium-rich solution in a bipolar membrane electrodialysis system, to obtain a secondary concentrated lithium-rich solution; in which, in the secondary concentrated lithium-rich solution, the concentration of $Li^+$ is 3 g/L-30 g/L and the concentration of $Na^+$ is 0.04 g/L-12 g/L;

S8. evaporating the secondary concentrated lithium-rich solution in vacuum or under the protection of inert gas for concentration, to obtain lithium hydroxide.

Furthermore, in the step S1, the molar ratio of $Al^{3+}$ in the aluminum salt solution to $Li^+$ in the lithium extraction mother solution of salt lake brine is 1:1-5:1; the molar ratio of the sum of moles of $OH^-$ in the sodium hydroxide solution and $OH^-$ in the lithium extraction mother solution of salt lake brine to $Li^+$ in the lithium extraction mother solution of salt lake brine is 4:1-10:1.

Furthermore, in the step S1, the molar ratio of $Al^{3+}$ in the aluminum salt solution to $Li^+$ in the lithium extraction mother solution of salt lake brine is 1.5:1-3.5:1; the molar ratio of the sum of moles of $OH^-$ in the sodium hydroxide solution and $OH^-$ in the lithium extraction mother solution of salt lake brine to $Li^+$ in the lithium extraction mother solution of salt lake brine is 5:1-8:1.

Furthermore, in the step S1, the pH of the system is maintained at 9-11 during the coprecipitation reaction.

Furthermore, in the step S1, the lithium extraction mother solution of salt lake brine is co-precipitated with the aluminum salt solution and the sodium hydroxide solution at 30° C.-50° C.

Furthermore, in the lithium extraction mother solution of salt lake brine, the concentration of $Li^+$ is 1.3 g/L-1.7 g/L, the concentration of $CO_3^{2-}$ is 15 g/L-25 g/L and the concentration of $OH^-$ is 10 g/L-20 g/L; in the lithium-containing solution, the concentration of $Li^+$ is 0.5 g/L-1.5 g/L and the aluminum-to-lithium ratio is 0.05-0.3; in the primary concentrated lithium-rich solution, the concentration of $Li^+$ is 3.5 g/L-7.5 g/L and the aluminum-to-lithium ratio is 0.05-0.3; in the secondary concentrated lithium-rich solution, the concentration of $Li^+$ is 1.5 g/L-8.0 g/L and the concentration of $Al^{3+}$ is not greater than 10 ppm.

Furthermore, the aluminum salt solution is any one of aluminum nitrate solution, aluminum sulfate solution or aluminum chloride solution.

Furthermore, in the step S5, desalted water in which the concentration of $Li^+$ is 0.005 g/L-0.1 g/L is also obtained after the primary concentration and enrichment; and the desalted water is used to formulate the aluminum salt solution.

Furthermore, in the step S2, the nucleation system is aged by a hydrothermal method or a reflux method.

Furthermore, in the step S1, the aluminum salt solution and the sodium hydroxide solution are both dropwise added into the lithium extraction mother solution of salt lake brine at a rate of 1 mL/min-5 mL/min.

Furthermore, in the step S7, the concentration of $Li^+$ in the initial lithium hydroxide solution charged into the bipolar membrane electrodialysis system is 0.06 g/L-0.7 g/L, the concentration of $Na^+$ in the initial polar liquid is 6.5 g/L-15 g/L; the cycling time is 10 min-30 min, and the voltage of bipolar membrane electrodialysis is 10 V-30 V.

The present application utilizes a lithium extraction mother solution of salt lake brine as a raw material to separate and extract lithium resources in it by a coprecipitation method, after then the lithium, carbonate ions and hydroxide ions are converted into lithium aluminum hydrotalcite, then lithium ions in the obtained lithium aluminum hydrotalcite are transferred into an aqueous solution again by an acidification method, thereby separating the lithium ions from carbonate ions and other impurity ions, and avoiding the process of removing carbonate ions by acid/alkaline adjustment as in the existing technology; the lithium aluminate solution obtained after acidification is sequentially subjected to nanofiltration-reverse osmosis-deeply aluminum removement-bipolar membrane electrodialysis, finally obtaining lithium hydroxide; the purity of the resulting lithium hydroxide can be up to 99.0%. The preparation method enables the combination of the comprehensive utilization and functional utilization of salt lake resources, and improves the utilization efficiency of resources.

DETAILED DESCRIPTION OF THE EMBODIMENTS

The embodiments of the present application will be described in detail below. However, the present application may be implemented in various forms, and the present application should not be interpreted to be limited to these specific embodiments set forth herein. On the contrary, these embodiments are provided to explain the principle of the present application and its practical applications, so that other persons with skills in the art can understand various embodiments in the present application and various modifications suitable for particularly intended applications.

With respect to the problems of waste of resources, complicated process, high cost caused by the consumption of acid and alkaline and the like existed in the general treatment method of the lithium extraction mother solution of salt lake brine at present, the present application provides another whole new method of recycling and utilizing the lithium extraction mother solution of salt lake brine, which employs the lithium extraction mother solution of salt lake brine as the raw material for the preparation of lithium hydroxide, thus utilizing the lithium resources and hydroxide ions in the lithium extraction mother solution of salt lake brine sufficiently and the utilization efficiency of resources.

Specifically, the preparation method of lithium hydroxide includes the following steps:

In the step S1, an aluminum salt solution and a sodium hydroxide solution are simultaneously dropwise added into a lithium extraction mother solution of salt lake brine for coprecipitation reaction at 25° C.-70° C., preferably at 30° C.-50° C., while the pH of the system is kept at 8-13, preferably at 9-11, to obtain a nucleation system with lithium aluminum hydrotalcite crystal nucleus.

In particular, as the raw material, the lithium extraction mother solution of salt lake brine is basically composed of: the concentration of $Li^+$ is 1 g/L-2 g/L, preferably 1.3 g/L-1.7 g/L, the concentration of $CO_3^{2-}$ is 10 g/L-30 g/L, preferably 15 g/L-25 g/L and the concentration of $OH^-$ is 5 g/L-25 g/L, preferably 10 g/L-20 g/L.

More specifically, the aluminum salt solution is any one of aluminum nitrate solution, aluminum sulfate solution or aluminum chloride solution.

Furthermore, the molar ratio of $Al^{3+}$ in the aluminum salt solution to $Li^+$ in the lithium extraction mother solution of salt lake brine is controlled at 1:1-5:1, preferably 1.5:1-3.5:1; at the same time, the molar ratio of the sum of moles of $OH^-$ in the sodium hydroxide solution and $OH^-$ in the lithium extraction mother solution of salt lake brine to $Li^+$ in the lithium extraction mother solution of salt lake brine is 4:1-10:1, preferably 5:1-8:1.

Preferably, an aluminum salt solution and a sodium hydroxide solution with the same volume as the lithium extraction mother solution of salt lake brine can be formulated in advance, and the molar concentration of $Al^{3+}$ in the aluminum salt solution is controlled at 1-5 times the molar concentration of $Li^+$ in the lithium extraction mother solution of salt lake brine, preferably 1.5-3.5 times, and at the same time, the sum of moles of $OH^-$ in the sodium hydroxide solution and $OH^-$ in the lithium extraction mother solution of salt lake brine is controlled at 4-10 times the molar concentration of $Li^+$ in the lithium extraction mother solution of salt lake brine, preferably 5-8 times. Then, the aluminum salt solution and t sodium hydroxide solution are both dropwise added into the lithium extraction mother solution of salt lake brine preferably at a rate of 1 mL/min-5 mL/min for coprecipitation reaction.

As such, through the coprecipitation reaction between the lithium extraction mother solution of salt lake brine and the aluminum salt solution and the sodium hydroxide solution added simultaneously, the nucleation process of the preformed lithium aluminum hydrotalcite is achieved, and the lithium aluminum hydrotalcite crystal nucleus formed during the nucleation process can be the bases for the subsequent growth of lithium aluminum hydrotalcite.

In the step S2, the nucleation system is aged at 50° C.-150° C. for 6 h-48 h for solid-liquid separation, to obtain filter cakes of lithium aluminum hydrotalcite.

The above aging is carried out by a hydrothermal method or a reflux method.

In the step S3, the filter cakes of lithium aluminum hydrotalcite are washed and dried, to obtain lithium aluminum hydrotalcite.

Preferably, the filter cakes of lithium aluminum hydrotalcite after washing are dried at 60° C.-120° C. for 12 h-48 h, thus obtaining lithium aluminum hydrotalcite.

In the step S4, the lithium aluminum hydrotalcite is dissolved by an acidification method, to obtain a lithium aluminate solution.

In particular, in the obtained lithium aluminate solution, the concentration of Li+ is 1.5 g/L-10 g/L, the concentration of $Al^{3+}$ is 10 g/L-80 g/L and the concentration of $Cl^-$ is 70 g/L-450 g/L.

In the step S5, the lithium aluminate solution is sequentially subjected to nanofiltration system for lithium-aluminum separation and to a reverse osmosis system for primary enrichment and concentration, to obtain a primary concentrated lithium-rich solution.

In particular, the lithium aluminate solution is separated in a nanofiltration system, to obtain nanofiltrated desalted water in which the concentration of $Li^+$ is 0.2 g/L-2.0 g/L, preferably 0.5 g/L-1.5 g/L and the aluminum-to-lithium ratio is 0.01-0.6, preferably 0.05-0.3; the nanofiltrated desalted water is concentrated primarily in a reverse osmosis system, to obtain a primary concentrated lithium-rich solution in which the concentration of $Li^+$ is 1.5 g/L-8 g/L, preferably 3.5 g/L-7.5 g/L and the aluminum-to-lithium ratio is 0.01-0.6, preferably 0.05-0.3.

Preferably, the lithium aluminate solution is diluted by 4-15 times, preferably 7-12 times, and then nanofiltrated for lithium-aluminum separation, in which the nanofiltration membrane ratio is controlled at 1:1-7:1, preferably 2:1-5:1, and the operating pressure of the separating unit is controlled at 0.5 MPa-5.0 MPa, preferably 2.0 MPa-4.0 MPa. During the reverse osmosis operation on the nanofiltrated desalted water for primary enrichment and concentration, the reverse osmosis membrane ratio is controlled at 1:1-7:1, preferably 2:1-5:1, the concentration volume ratio (the volume ratio of the lithium aluminate solution to the primary concentrated lithium-rich solution) is controlled at 4:1-15:1, preferably 5:1-11:1, and the operating pressure of the concentration unit is controlled at 1 MPa-10 MPa, preferably 2.5 MPa-6 MPa.

In this step, the nanofiltration membrane used in the nanofiltration operation for lithium-aluminum separation may be one or two of DK membrane, DL membrane and NF membrane; and the reverse osmosis membrane used in the reverse osmosis operation for primary enrichment and concentration may be Dow BW membrane and/or SW membrane.

After primary concentration operation on the nanofiltrated desalted water through reverse osmosis, desalted water corresponding to the primary concentrated lithium-rich solution is further obtained; in this desalted water, the concentration of $Li^+$ is 0.05 g/L-0.1 g/L, and it can be used to formulate the aluminum salt solution described above.

In the step S6, aluminum is removed deeply from the primary concentrated lithium-rich solution, to obtain an aluminum-removed lithium-rich solution.

In particular, in the resulting aluminum-removed lithium-rich solution, the concentration of $Li^+$ is 1.5 g/L-8.0 g/L and the concentration of $Al^{3+}$ is not greater than 10 ppm.

In the step S7, the aluminum-removed lithium-rich solution is enriched and concentrated secondarily in a bipolar membrane electrodialysis system, to obtain a secondary concentrated lithium-rich solution.

In particular, the bipolar membrane electrodialysis system used in this step includes a cathode chamber and an anode chamber disposed oppositely, and a membrane stack disposed between the two electrode chambers (i.e., the cathode chamber and the anode chamber); the membrane stack is composed of several bipolar membranes arranged parallelly. These bipolar membranes are separated to form a number of alkaline chambers and material liquor chambers arranged alternately, and each chamber (i.e., the alkaline chambers and material liquor chambers) is provided with chamber clapboard. The outside of the electrode chamber is connected to an electrode liquor tank, the outside of the alkaline chamber is connected to an alkaline liquor tank, and the outside of the material liquor chamber is connected to a material liquor tank. The initial electrode liquor is stored in the electrode liquor tank, the initial lithium hydroxide solution is stored in the alkaline liquor tank, and some of the aluminum-removed lithium-rich solution is stored in the material liquor chamber. Thereby, pumps can be respectively used to enable the circulation of the aluminum-removed lithium-rich solution between the material liquor tank and the material liquor chamber, the circulation of the initial lithium hydroxide solution between the alkaline liquor tank and the alkaline chamber, and the circulation of the initial electrode liquor between the electrode liquor tank and the electrode chamber simultaneously. After the above circulations for a certain time, a direct current with a certain voltage is applied. Water is electrolyzed under the catalytic actions of the direct-current electric field and the bipolar membrane to generate H+ and $OH^-$, in which under the action of the direct-current electric field, $OH^-$ enters the alkaline chamber, and $H^+$ enters the material liquor chamber; Li+ and $Na^+$ in the material liquor chamber enter the alkaline chamber; during the continuous electrodialysis, $Li^+$ and $OH^-$ are gathered in the alkaline chamber. Finally, a secondary concentrated lithium-rich solution is obtained in the alkaline chamber; the secondary concentrated lithium-rich solution mainly includes lithium hydroxide, and contains a little sodium hydroxide.

Furthermore, the concentration of $Li^+$ in the initial lithium hydroxide solution is controlled at 0.06 g/L-0.7 g/L, the concentration of $Na^+$ in the initial polar liquid is controlled at 6.5 g/L-15 g/L; the cycling time is 10 min-30 min, and the voltage of bipolar membrane electrodialysis is 10 V-30 V.

Therefore, in the resulting secondary concentrated lithium-rich solution, the concentration of $Li^+$ is 3 g/L-30 g/L, preferably 5 g/L-18 g/L and the concentration of $Na^+$ is 0.04 g/L-12 g/L.

At the same time, a hydrochloric acid concentrate is also obtained in the material liquor chamber; in the hydrochloric acid concentrate, the concentration of $H^+$ is 0.4 g/L-4.5 g/L, preferably 0.7 g/L-2.6 g/L.

In the step S8, the concentrated lithium-rich solution is evaporated in a MVR system for concentration and crystallization, to obtain lithium hydroxide.

In particular, the evaporation process is carried out in vacuum or under the protection of inert gas, and the evaporating temperature is controlled at 50° C.-110° C.; after concentration and crystallization through evaporation, the crystallized products are dried at 40° C.-100° C. to obtain lithium hydroxide products.

As such, the lithium hydroxide products with content of up to 99.0% can be obtained by the preparation method of the present application.

As such, a lithium extraction mother solution of salt lake brine is used as a raw material to extract lithium resources by a coprecipitation method, the carbonate ions and hydroxide ions therein are utilized sufficiently to convert lithium, carbonate ions and hydroxide ions into lithium aluminum hydrotalcite which has a wide range of applications. Subsequently, the lithium resources in the lithium aluminum hydrotalcite are transferred into a water phase by an acid dissolution method, thereby separating lithium resources from other impurity ions. After then, the resulting lithium-containing solution is evaporated for concentration and enrichment to directly obtain lithium hydroxide. The preparation method enables the combination of the comprehensive utilization and functional utilization of salt lake resources, and improves the utilization efficiency of resources; in addition, the preparation method has the advantages of green, highly efficiency, energy conservation, low investment, low energy consumption, low pollution and the like, and it requires simple equipment, the operation procedures are short and easy to control, suitable for industrialized promotion.

The preparation method of lithium hydroxide described above in the present application will be illustrated in the following specific embodiments. However, the following embodiments are only specific examples of the preparation method in the present application and are not intended to limit them all.

Embodiment 1

The lithium extraction mother solution of salt lake brine used in this embodiment is the mother solution produced after preparing lithium carbonate from the brine of a salt lake in Qinghai province; in which, the concentration of $Li^+$ is 1.3 g/L, the concentration of $CO_3^{2-}$ is 15 g/L and the concentration of $OH^-$ is 5 g/L.

Firstly, 67.8 g aluminum chloride hexahydrate was weighed to formulate 1 L of aluminum salt solution, and then 18.30 g sodium hydroxide was weighed to formulate 1 L of sodium hydroxide solution.

Secondly, the above formulated aluminum salt solution and sodium hydroxide solution were dropwise added into 1 L of the above lithium extraction mother solution of salt lake brine simultaneously at a rate of 5 mL/min for coprecipitation reaction at 70° C. and at pH 11, to obtain a nucleation system with lithium aluminum hydrotalcite crystal nucleus.

Thirdly, the nucleation system obtained above was aged at 150° C. for 48 h by a hydrothermal method, and then filtered to obtain filter cakes of lithium aluminum hydrotalcite.

Step 4. The filter cakes of lithium aluminum hydrotalcite were washed to nearly neutral, and dried at 120° C. for 48 h, obtaining lithium aluminum hydrotalcite.

Step 5. The resulting lithium aluminum hydrotalcite was dissolved completely in a hydrochloric acid solution of 2 mol/L, to obtain a lithium aluminate solution, in which the concentration of $Li^+$ was 1.5 g/L, the concentration of $Al^{3+}$ was 10 g/L and the concentration of $Cl^-$ was 70 g/L.

Step 6. The lithium aluminate solution was diluted by 2 times and then introduced into a DK nanofiltration system for lithium-aluminum separation, during which the operating pressure was controlled at 2.0 MPa, thus obtaining nanofiltrated desalted water in which the concentration of $Li^+$ was 0.5 g/L and the mass ratio of Al/Li was 0.3; then the nanofiltrated desalted water was charged into a BW-series reverse osmosis system for primary concentration, during which the membrane-entering pressure was controlled at 2.5 MPa, and the concentration volume ratio (the volume ratio of lithium-rich solution/primary concentrated solution) was controlled at 5.0, thus obtaining reverse osmosis-concentrated water in which the concentration of $Li^+$ was 3.5 g/L and the aluminum-to-lithium ratio is 0.3; then the reverse osmosis-concentrated water was charged into an electrodialysis system for secondary concentration, thus obtaining a concentrated lithium-rich solution in which the concentration of $Li^+$ was 22.0 g/L and the aluminum-to-lithium ratio was 0.5.

At the same time, the obtained reverse osmosis-desalted water in which the content of $Li^+$ was 0.10 g/L was directly recycled for diluting the lithium aluminate solution.

Step 7. A sodium hydroxide solution with a mass fraction of 30% was added into the concentrated lithium-rich solution to remove aluminum ions from the concentrated lithium-rich solution until the concentration of the aluminum ions was not greater than 10 ppm, and then solid-liquid separation was carried out to obtain an aluminum-removed lithium-rich solution.

Step 8. The aluminum-removed lithium-rich solution was charged into a bipolar membrane electrodialysis system for secondary enrichment and concentration, to obtain a secondary concentrated lithium-rich solution.

In particular, the resulting primary concentrated lithium-rich solution in which the concentration of $Li^+$ was 3.5 g/L was added into the material liquor tank, an initial lithium hydroxide solution in which the concentration of $Li^+$ was 0.3 g/L was added into the alkaline liquor tank, and an electrode liquor in which the concentration of $Na^+$ was 6.5 g/L was added into the electrode liquor tank. A material liquor pump, an alkaline liquor pump and an electrode liquor pump were respectively used to enable the circulation of the primary concentrated lithium-rich solution between the material liquor tank and the material liquor chamber, the circulation of the initial lithium hydroxide solution between the alkaline liquor tank and the alkaline chamber, and the circulation of the electrode liquor between the electrode liquor tank and two electrode chambers. After circulation for 10 min, the voltage of bipolar membrane electrodialysis was set at 30 V for bipolar membrane electrodialysis. After the bipolar membrane electrodialysis, a hydrochloric acid concentrate was obtained in the material liquor tank, and at the same time, a secondary concentrated lithium-rich solution in which the concentration of $Li^+$ was 20 g/L and the concentration of $Na^+$ was 12 g/L was obtained in the alkaline liquor tank, and the concentration of $H^+$ in the resulting hydrochloric acid concentrate was 2.6 g/L.

Finally, the concentrated lithium-rich solution was evaporated in a MVR system in vacuum and at a temperature of 50° C. for concentration and crystallization, and the crystallized products were dried at 40° C. to obtain lithium hydroxide.

In the lithium hydroxide obtained in this embodiment, the content of lithium hydroxide monohydrate was more than 99.0%.

Embodiment 2

The lithium extraction mother solution of salt lake brine used in this embodiment is the mother solution produced after preparing lithium carbonate from the brine of a salt lake in Qinghai province; in which, the concentration of $Li^+$ is 2 g/L, the concentration of $CO_3^{2-}$ is 10 g/L and the concentration of $OH^-$ is 20 g/L.

Firstly, 540.4 g aluminum nitrate nonahydrate was weighed to formulate 1 L of aluminum salt solution, and then 10.8 g sodium hydroxide was weighed to formulate 1 L of sodium hydroxide solution.

Secondly, the above formulated aluminum salt solution and sodium hydroxide solution were dropwise added into 1 L of the above lithium extraction mother solution of salt lake brine simultaneously at a rate of 1 mL/min for coprecipitation reaction at 50° C. and at pH 8, to obtain a nucleation system with lithium aluminum hydrotalcite crystal nucleus.

Thirdly, the nucleation system obtained above was aged at 50° C. for 6 h by a hydrothermal method, and then filtered to obtain filter cakes of lithium aluminum hydrotalcite.

Step 4. The filter cakes of lithium aluminum hydrotalcite were washed to nearly neutral, and dried at 60° C. for 30 h, obtaining lithium aluminum hydrotalcite.

Step 5. The resulting lithium aluminum hydrotalcite was dissolved completely in a hydrochloric acid solution of 12 mol/L, to obtain a lithium aluminate solution, in which the concentration of $Li^+$ was 10 g/L, the concentration of $Al^{3+}$ was 80 g/L and the concentration of $Cl^-$ was 450 g/L.

Step 6. The lithium aluminate solution was diluted by 12 times and then introduced into a DL nanofiltration system for lithium-aluminum separation, during which the operating pressure was controlled at 5.0 MPa, thus obtaining nanofiltrated desalted water in which the concentration of $Li^+$ was 2 g/L and the mass ratio of Al/Li was 0.01; then the nanofiltrated desalted water was charged into a SW-series reverse osmosis system for primary concentration, during which the membrane-entering pressure was controlled at 10 MPa, and the concentration volume ratio (the volume ratio of lithium-rich solution/primary concentrated solution) was controlled at 15, thus obtaining reverse osmosis-concentrated water in which the concentration of $Li^+$ was 8 g/L and the aluminum-to-lithium ratio was 0.01; then the reverse osmosis-concentrated water was charged into an electrodialysis system for secondary concentration, thus obtaining a concentrated lithium-rich solution in which the concentration of $Li^+$ was 15 g/L and the aluminum-to-lithium ratio was 0.05.

At the same time, the obtained reverse osmosis-desalted water in which the content of $Li^+$ was 0.01 g/L was directly recycled for diluting the lithium aluminate solution.

Step 7. A sodium hydroxide solution with a mass fraction of 20% was added into the concentrated lithium-rich solution to remove aluminum ions from the concentrated lithium-rich solution until the concentration of the aluminum ions was not greater than 10 ppm, and then solid-liquid separation was carried out to obtain an aluminum-removed lithium-rich solution.

Step 8. The aluminum-removed lithium-rich solution was charged into a bipolar membrane electrodialysis system for secondary enrichment and concentration, to obtain a secondary concentrated lithium-rich solution.

In particular, the resulting primary concentrated lithium-rich solution in which the concentration of $Li^+$ was 1.5 g/L was added into the material liquor tank, an initial lithium hydroxide solution in which the concentration of $Li^+$ was 0.06 g/L was added into the alkaline liquor tank, and an electrode liquor in which the concentration of $Na^+$ was 15 g/L was added into the electrode liquor tank. A material liquor pump, an alkaline liquor pump and an electrode liquor pump were respectively used to enable the circulation of the primary concentrated lithium-rich solution between the material liquor tank and the material liquor chamber, the circulation of the initial lithium hydroxide solution between the alkaline liquor tank and the alkaline chamber, and the circulation of the electrode liquor between the electrode liquor tank and two electrode chambers. After circulation for 30 min, the voltage of bipolar membrane electrodialysis was set at 10 V for bipolar membrane electrodialysis. After the bipolar membrane electrodialysis, a hydrochloric acid concentrate was obtained in the material liquor tank, and at the same time, a secondary concentrated lithium-rich solution in which the concentration of $Li^+$ was 3 g/L and the concentration of $Na^+$ was 0.04 g/L was obtained in the alkaline liquor tank, and the concentration of $H^+$ in the resulting hydrochloric acid concentrate was 0.4 g/L.

Finally, the concentrated lithium-rich solution was evaporated in a MVR system under the protection of inert gas and at a temperature of 110° C. for concentration and crystallization, and the crystallized products were dried at 100° C. to obtain lithium hydroxide.

In the lithium hydroxide obtained in this embodiment, the content of lithium hydroxide monohydrate was more than 99.0%.

Embodiment 3

The lithium extraction mother solution of salt lake brine used in this embodiment is the mother solution produced after preparing lithium carbonate from the brine of a salt lake in Qinghai province; in which, the concentration of $Li^+$ is 1.7 g/L, the concentration of $CO_3^{2-}$ is 30 g/L and the concentration of $OH^-$ is 25 g/L.

Firstly, 146.7 g aluminum sulfate was weighed to formulate 1 L of aluminum salt solution, and then 19.8 g sodium hydroxide was weighed to formulate 1 L of sodium hydroxide solution.

Secondly, the above formulated aluminum salt solution and sodium hydroxide solution were dropwise added into 1 L of the above lithium extraction mother solution of salt lake brine simultaneously at a rate of 3 mL/min for coprecipitation reaction at 30° C. and at pH 13, to obtain a nucleation system with lithium aluminum hydrotalcite crystal nucleus.

Thirdly, the nucleation system obtained above was aged at 80° C. for 24 h by a hydrothermal method, and then filtered to obtain filter cakes of lithium aluminum hydrotalcite.

Step 4. The filter cakes of lithium aluminum hydrotalcite were washed to nearly neutral, and dried at 80° C. for 20 h, obtaining lithium aluminum hydrotalcite.

Step 5. The resulting lithium aluminum hydrotalcite was dissolved completely in a hydrochloric acid solution of 6 mol/L, to obtain a lithium aluminate solution, in which the concentration of $Li^+$ was 5 g/L, the concentration of $Al^{3+}$ was 40 g/L and the concentration of $Cl^-$ was 225 g/L.

Step 6. The lithium aluminate solution was diluted by 5 times and then introduced into a NF nanofiltration system for lithium-aluminum separation, during which the operating pressure was controlled at 4.0 MPa, thus obtaining nanofiltrated desalted water in which the concentration of $Li^+$ was 1.5 g/L and the mass ratio of Al/Li was 0.6; then the nanofiltrated desalted water was charged into a BW-series reverse osmosis system for primary concentration, during which the membrane-entering pressure was controlled at 6 MPa, and the concentration volume ratio (the volume ratio of lithium-rich solution/primary concentrated solution) was controlled at 11, thus obtaining reverse osmosis-concentrated water in which the concentration of $Li^+$ was 7.5 g/L and the aluminum-to-lithium ratio was 0.6; then the reverse osmosis-concentrated water was charged into an electrodialysis system for secondary concentration, thus obtaining a concentrated lithium-rich solution in which the concentration of $Li^+$ was 20.0 g/L and the aluminum-to-lithium ratio was 0.8.

At the same time, the obtained reverse osmosis-desalted water in which the content of $Li^+$ was 0.07 g/L was directly recycled for diluting the lithium aluminate solution.

Step 7. A sodium hydroxide solution with a mass fraction of 25% was added into the concentrated lithium-rich solution to remove aluminum ions from the concentrated lithium-rich solution until the concentration of the aluminum ions was not greater than 10 ppm, and then solid-liquid separation was carried out to obtain an aluminum-removed lithium-rich solution.

Step 8. The aluminum-removed lithium-rich solution was charged into a bipolar membrane electrodialysis system for secondary enrichment and concentration, to obtain a secondary concentrated lithium-rich solution.

In particular, the resulting primary concentrated lithium-rich solution in which the concentration of $Li^+$ was 7.5 g/L was added into the material liquor tank, an initial lithium hydroxide solution in which the concentration of $Li^+$ was 0.3 g/L was added into the alkaline liquor tank, and an electrode liquor in which the concentration of $Na^+$ was 8 g/L was added into the electrode liquor tank. A material liquor pump, an alkaline liquor pump and an electrode liquor pump were respectively used to enable the circulation of the primary concentrated lithium-rich solution between the material liquor tank and the material liquor chamber, the circulation of the initial lithium hydroxide solution between the alkaline liquor tank and the alkaline chamber, and the circulation of the electrode liquor between the electrode liquor tank and two electrode chambers. After circulation for 15 min, the voltage of bipolar membrane electrodialysis was set at 20 V for bipolar membrane electrodialysis. After the bipolar membrane electrodialysis, a hydrochloric acid concentrate was obtained in the material liquor tank, and at the same time, a secondary concentrated lithium-rich solution in which the concentration of $Li^+$ was 5 g/L and the concentration of $Na^+$ was 4 g/L was obtained in the alkaline liquor tank, and the concentration of $H^+$ in the resulting hydrochloric acid concentrate was 0.7 g/L.

Finally, the concentrated lithium-rich solution was evaporated in a MVR system under the protection of inert gas and at a temperature of 80° C. for concentration and crystallization, and the crystallized products were dried at 60° C. to obtain lithium hydroxide.

In the lithium hydroxide obtained in this embodiment, the content of lithium hydroxide monohydrate was more than 99.0%.

Embodiment 4

The lithium extraction mother solution of salt lake brine used in this embodiment is the mother solution produced after preparing lithium carbonate from the brine of a salt lake in Qinghai province; in which, the concentration of $Li^+$ is 1 g/L, the concentration of $CO_3^{2-}$ is 25 g/L and the concentration of $OH^-$ is 10 g/L.

Firstly, 34.791 g aluminum chloride hexahydrate was weighed to formulate 1 L of aluminum salt solution, and then 34.1 g sodium hydroxide was weighed to formulate 1 L of sodium hydroxide solution.

Secondly, the above formulated aluminum salt solution and sodium hydroxide solution were dropwise added into 1 L of the above lithium extraction mother solution of salt lake brine simultaneously at a rate of 4 mL/min for coprecipitation reaction at 25° C. and at pH 9, to obtain a nucleation system with lithium aluminum hydrotalcite crystal nucleus.

Thirdly, the nucleation system obtained above was aged at 100° C. for 12 h by a hydrothermal method, and then filtered to obtain filter cakes of lithium aluminum hydrotalcite.

Step 4. The filter cakes of lithium aluminum hydrotalcite were washed to nearly neutral, and dried at 100° C. for 12 h, obtaining lithium aluminum hydrotalcite.

Step 5. The resulting lithium aluminum hydrotalcite was dissolved completely in a hydrochloric acid solution of 8 mol/L, to obtain a lithium aluminate solution, in which the concentration of $Li^+$ was 6 g/L, the concentration of $Al^{3+}$ was 50 g/L and the concentration of $Cl^-$ was 280 g/L.

Step 6. The lithium aluminate solution was diluted by 15 times and then introduced into a DK nanofiltration system for lithium-aluminum separation, during which the operating pressure was controlled at 0.5 MPa, thus obtaining nanofiltrated desalted water in which the concentration of $Li^+$ was 0.2 g/L and the mass ratio of Al/Li was 0.05; then the nanofiltrated desalted water was charged into a SW-series reverse osmosis system for primary concentration, during which the membrane-entering pressure was controlled at 1 MPa, and the concentration volume ratio (the volume ratio of lithium-rich solution/primary concentrated solution) was controlled at 4.0, thus obtaining reverse osmosis-concentrated water in which the concentration of $Li^+$ was 1.5 g/L and the aluminum-to-lithium ratio was 0.05; then the reverse osmosis-concentrated water was charged into an electrodialysis system for secondary concentration, thus obtaining a concentrated lithium-rich solution in which the concentration of $Li^+$ was 13.0 g/L and the aluminum-to-lithium ratio was 0.06.

At the same time, the obtained reverse osmosis-desalted water in which the content of $Li^+$ was 0.10 g/L was directly recycled for diluting the lithium aluminate solution.

Step 7. A sodium hydroxide solution with a mass fraction of 28% was added into the concentrated lithium-rich solution to remove aluminum ions from the concentrated lithium-rich solution until the concentration of the aluminum ions was not greater than 10 ppm, and then solid-liquid separation was carried out to obtain an aluminum-removed lithium-rich solution.

Step 8. The aluminum-removed lithium-rich solution was charged into a bipolar membrane electrodialysis system for secondary enrichment and concentration, to obtain a secondary concentrated lithium-rich solution.

In particular, the resulting primary concentrated lithium-rich solution in which the concentration of $Li^+$ was 8 g/L was added into the material liquor tank, an initial lithium hydroxide solution in which the concentration of $Li^+$ was 0.7 g/L was added into the alkaline liquor tank, and an electrode liquor in which the concentration of $Na^+$ was 10 g/L was added into the electrode liquor tank. A material liquor pump, an alkaline liquor pump and an electrode liquor pump were respectively used to enable the circulation of the primary concentrated lithium-rich solution between the material liquor tank and the material liquor chamber, the circulation of the initial lithium hydroxide solution between the alkaline liquor tank and the alkaline chamber, and the circulation of the electrode liquor between the electrode liquor tank and two electrode chambers. After circulation for 20 min, the voltage of bipolar membrane electrodialysis was set at 15 V for bipolar membrane electrodialysis. After the bipolar membrane electrodialysis, a hydrochloric acid concentrate was obtained in the material liquor tank, and at the same time, a secondary concentrated lithium-rich solution in which the concentration of $Li^+$ was 30 g/L and the concentration of $Na^+$ was 8 g/L was obtained in the alkaline liquor tank, and the concentration of $H^+$ in the resulting hydrochloric acid concentrate was 4.5 g/L.

Finally, the concentrated lithium-rich solution was evaporated in a MVR system under the protection of inert gas and at a temperature of 100° C. for concentration and crystallization, and the crystallized products were dried at 80° C. to obtain lithium hydroxide.

In the lithium hydroxide obtained in this embodiment, the content of lithium hydroxide monohydrate was more than 99.0%.

Although the present application has been shown and described with reference to specific embodiments, it should be understood to persons skilled in the art that various modifications can be made in terms of forms and details without deviating from the spirit and scope of the present application defined by the claims and equivalents thereof.

What is claimed is:

1. A preparation method of lithium hydroxide, wherein, comprising the following steps:
   S1. simultaneously dropwise adding an aluminum salt solution and a sodium hydroxide solution into a lithium extraction mother solution of salt lake brine for a coprecipitation reaction at 25° C.–70° C., while keeping a pH of a system at 8-13, to obtain a nucleation system with lithium aluminum hydrotalcite crystal nucleus; wherein, in the lithium extraction mother solution of salt lake brine, a concentration of $Li^+$ is 1 g/L-2 g/L, a concentration of $CO_3^{2-}$ is 10 g/L-30 g/L and a concentration of $OH^-$ is 5 g/L-25 g/L;
   wherein, a molar ratio of $Al^{3+}$ in the aluminum salt solution to $Li^+$ in the lithium extraction mother solution of salt lake brine is 1.5:1-3.5:1; a molar ratio of a sum of moles of $OH^-$ in the sodium hydroxide solution and $OH^-$ in the lithium extraction mother solution of salt lake brine to $Li^+$ in the lithium extraction mother solution of salt lake brine is 5:1-8:1;
   S2. aging the nucleation system at 50° C.–150° C. through a hydrothermal method or a reflux method for 6 h-48 h for a solid-liquid separation, to obtain filter cakes of lithium aluminum hydrotalcite;
   S3. washing and drying the filter cakes of the lithium aluminum hydrotalcite to obtain the lithium aluminum hydrotalcite;
   S4. with 2 mol/L-12 mol/L of hydrochloric acid as a raw material, dissolving the lithium aluminum hydrotalcite by an acidification method, to obtain a lithium aluminate solution; wherein, in the lithium aluminate solution, a concentration of $Li^+$ is 1.5 g/L-10 g/L, a concentration of $Al^{3+}$ is 10 g/L-80 g/L and the concentration of $Cl^-$ is 70 g/L-450 g/L;
   S5. sequentially subjecting the lithium aluminate solution to a nanofiltration system for a lithium-aluminum separation and to a reverse osmosis system for a primary enrichment and concentration, to obtain a primary concentrated lithium-rich solution; wherein, in a nanofiltrated desalted water obtained after a nanofiltration, a concentration of $Li^+$ is 0.2 g/L-2.0 g/L and an aluminum-to-lithium ratio is 0.01-0.6; in the primary concentrated lithium-rich solution obtained after a reverse osmosis, a concentration of $Li^+$ is 1.5 g/L-8.0 g/L and the aluminum-to-lithium ratio is 0.01-0.6;
   S6. deeply removing aluminum from the primary concentrated lithium-rich solution, to obtain an aluminum-removed lithium-rich solution; wherein, in the aluminum-removed lithium-rich solution, a concentration of $Li^+$ is 1.5 g/L-8.0 g/L, and a concentration of $Al^{3+}$ is not greater than 10 ppm;
   S7. performing a secondary enrichment and concentration on the aluminum-removed lithium-rich solution in a bipolar membrane electrodialysis system, to obtain a secondary concentrated lithium-rich solution; wherein, in the secondary concentrated lithium-rich solution, the concentration of $Li^+$ is 3 g/L-30 g/L and the concentration of $Na^+$ is 0.04 g/L-12 g/L;
   wherein, a concentration of $Li^+$ in an initial lithium hydroxide solution charged into the bipolar membrane electrodialysis system is 0.06 g/L-0.7 g/L, a concentration of $Na^+$ in an initial polar liquid is 6.5 g/L-15 g/L; a cycling time is 10 min-30 min, and a voltage of bipolar membrane electrodialysis is 10 V-30 V;
   S8. evaporating the secondary concentrated lithium-rich solution in a MVR system in vacuum or under a protection of inert gas for concentration and crystallization, to obtain the lithium hydroxide.

2. The preparation method according to claim 1, wherein: in the step S1, the pH of the system is maintained at 9-11 during the coprecipitation reaction.

3. The preparation method according to claim 1, wherein: in the step S1, the lithium extraction mother solution of salt lake brine is co-precipitated with the aluminum salt solution and the sodium hydroxide solution at 30° C.–50° C.

4. The preparation method according to claim 1, wherein: in the lithium extraction mother solution of salt lake brine, the concentration of $Li^+$ is 1.3 g/L-1.7 g/L, the concentration of $CO_3^{2-}$ is 15 g/L-25 g/L and the concentration of $OH^-$ is 10 g/L-20 g/L;
   in the nanofiltrated desalted water, the concentration of $Li^+$ is 0.5 g/L-1.5 g/L and the aluminum-to-lithium ratio is 0.05-0.3;
   in the reverse osmosis-concentrated water, the concentration of $Li^+$ is 3.5 g/L-7.5 g/L and the aluminum-to-lithium ratio is 0.05-0.3;
   in the aluminum-removed lithium-rich solution, the concentration of $Li^+$ is 1.5 g/L-8.0 g/L and the concentration of $Al^{3+}$ is not greater than 10 ppm.

5. The preparation method according to claim 1, wherein: the aluminum salt solution is one selected from the group consisting of an aluminum nitrate solution, an aluminum sulfate solution, and an aluminum chloride solution.

6. The preparation method according to claim 5, wherein: in the step S5, a desalted water in which the concentration of $Li^+$ is 0.005 g/L-0.1 g/L is obtained after the primary concentration and enrichment; and the desalted water is used to formulate the aluminum salt solution.

7. The preparation method according to claim 1, wherein: in the step S1, the aluminum salt solution and the sodium hydroxide solution are both dropwise added into the lithium extraction mother solution of salt lake brine at a rate of 1 mL/min-5 mL/min.

8. The preparation method according to claim 2, wherein: in the lithium extraction mother solution of salt lake brine, the concentration of $Li^+$ is 1.3 g/L-1.7 g/L, the concentration of $CO_3^{2-}$ is 15 g/L-25 g/L and the concentration of $OH^-$ is 10 g/L-20 g/L;

in the nanofiltrated desalted water, the concentration of $Li^+$ is 0.5 g/L-1.5 g/L and the aluminum-to-lithium ratio is 0.05-0.3;

in the reverse osmosis-concentrated water, the concentration of $Li^+$ is 3.5 g/L-7.5 g/L and the aluminum-to-lithium ratio is 0.05-0.3;

in the aluminum-removed lithium-rich solution, the concentration of $Li^+$ is 1.5 g/L-8.0 g/L and the concentration of $Al^{3+}$ is not greater than 10 ppm.

9. The preparation method according to claim 3, wherein: in the lithium extraction mother solution of salt lake brine, the concentration of $Li^+$ is 1.3 g/L-1.7 g/L, the concentration of $CO_3^{2-}$ is 15 g/L-25 g/L and the concentration of $OH^-$ is 10 g/L-20 g/L;

in the nanofiltrated desalted water, the concentration of $Li^+$ is 0.5 g/L-1.5 g/L and the aluminum-to-lithium ratio is 0.05-0.3;

in the reverse osmosis-concentrated water, the concentration of $Li^+$ is 3.5 g/L-7.5 g/L and the aluminum-to-lithium ratio is 0.05-0.3;

in the aluminum-removed lithium-rich solution, the concentration of $Li^+$ is 1.5 g/L-8.0 g/L and the concentration of $Al^{3+}$ is not greater than 10 ppm.

10. The preparation method according to claim 2, wherein: the aluminum salt solution is one selected from the group consisting of an aluminum nitrate solution, an aluminum sulfate solution, and an aluminum chloride solution.

11. The preparation method according to claim 3, wherein: the aluminum salt solution is one selected from the group consisting of an aluminum nitrate solution, an aluminum sulfate solution, and an aluminum chloride solution.

12. The preparation method according to claim 2, wherein: in the step S1, the aluminum salt solution and the sodium hydroxide solution are both dropwise added into the lithium extraction mother solution of salt lake brine at a rate of 1 mL/min-5 mL/min.

13. The preparation method according to claim 3, wherein: in the step S1, the aluminum salt solution and the sodium hydroxide solution are both dropwise added into the lithium extraction mother solution of salt lake brine at a rate of 1 mL/min-5 mL/min.

\* \* \* \* \*